United States Patent
Wang et al.

(10) Patent No.: US 12,474,736 B1
(45) Date of Patent: Nov. 18, 2025

(54) HEAD-MOUNTABLE DEVICE WITH PROTECTIVE LINER

(71) Applicant: Apple Inc., Cupertino, CA (US)

(72) Inventors: Paul X. Wang, Cupertino, CA (US); Jeremy C. Franklin, San Francisco, CA (US); Michael J. Rockwell, Palo Alto, CA (US)

(73) Assignee: Apple Inc., Cupertino, CA (US)

( * ) Notice: Subject to any disclaimer, the term of this patent is extended or adjusted under 35 U.S.C. 154(b) by 196 days.

(21) Appl. No.: 18/079,787

(22) Filed: Dec. 12, 2022

Related U.S. Application Data

(60) Provisional application No. 63/291,823, filed on Dec. 20, 2021.

(51) Int. Cl.
*G06F 1/16* (2006.01)
(52) U.S. Cl.
CPC .................................. *G06F 1/163* (2013.01)
(58) Field of Classification Search
CPC ........................................................ G06F 1/163
See application file for complete search history.

(56) References Cited

U.S. PATENT DOCUMENTS

| | | | | |
|---|---|---|---|---|
| 9,989,998 | B1* | 6/2018 | Yee | G02B 27/0176 |
| 10,034,508 | B2* | 7/2018 | Frank | G02B 27/0176 |
| 10,133,305 | B1* | 11/2018 | Sullivan | G02B 27/0176 |
| 10,209,524 | B2* | 2/2019 | Drinkwater | G02B 27/0176 |
| 10,380,716 | B2* | 8/2019 | Chun | G06F 3/013 |
| 10,739,600 | B1* | 8/2020 | Yee | G02B 27/0176 |
| 10,761,567 | B2* | 9/2020 | Ellis | A45F 5/00 |
| 11,500,202 | B2* | 11/2022 | Lee | G02B 27/0172 |
| 11,762,206 | B2* | 9/2023 | Hatfield | G06F 1/163 361/679.01 |
| 11,983,034 | B1* | 5/2024 | Hatfield | B29C 64/10 |
| 2016/0044981 | A1* | 2/2016 | Frank | G02B 27/0176 2/422 |
| 2017/0001364 | A1 | 1/2017 | Macdonald et al. | |
| 2017/0102767 | A1* | 4/2017 | Kim | H04N 13/327 |
| 2017/0270635 | A1* | 9/2017 | Chun | G11B 27/10 |
| 2019/0022400 | A1 | 1/2019 | Kumar et al. | |
| 2019/0041899 | A1* | 2/2019 | Ellis | G02B 27/0176 |
| 2020/0409150 | A1* | 12/2020 | Lee | G02B 7/02 |
| 2021/0041706 | A1* | 2/2021 | Hatfield | G06F 1/163 |
| 2023/0375843 | A1* | 11/2023 | Hatfield | G06F 1/163 |
| 2024/0053795 | A1* | 2/2024 | Trincia | G02C 5/126 |

* cited by examiner

*Primary Examiner* — Imani N Hayman
*Assistant Examiner* — Theron S Milliser
(74) *Attorney, Agent, or Firm* — BAKERHOSTETLER

(57) ABSTRACT

A head-mountable device can include exchangeable components that can be selected by a user. Such components can include face and head engaging components to secure the head-mountable device on the face and head of the user. Liners can be provided to isolate the components from external and/or environmental influences until removed by a user upon selection of a given set of components. The liners can provide a contact surface that is similar to a contact surface of the component itself. As such, the user can try the component with an authentic experience prior to selection.

17 Claims, 7 Drawing Sheets

HEAD-MOUNTABLE DEVICE WITH PROTECTIVE LINER

CROSS REFERENCE TO RELATED APPLICATIONS

This application claims the benefit of priority to U.S. Provisional Patent Application No. 63/291,823, entitled, "Head-Mountable Device with Protective Liner", filed on Dec. 20, 2021, the disclosure of each of which is hereby incorporated herein in its entirety.

TECHNICAL FIELD

The present description relates generally to head-mountable devices, and, more particularly, to protective liners for head-mountable devices.

BACKGROUND

A head-mountable device can be worn by a user to display visual information within the field of view of the user. The head-mountable device can be used as a virtual reality (VR) system, an augmented reality (AR) system, and/or a mixed reality (MR) system. A user may observe outputs provided by the head-mountable device, such as visual information provided on a display. The display can optionally allow a user to observe an environment outside of the head-mountable device. Other outputs provided by the head-mountable device can include speaker output and/or haptic feedback. A user may further interact with the head-mountable device by providing inputs for processing by one or more components of the head-mountable device. For example, the user can provide tactile inputs, voice commands, and other inputs while the device is mounted to the user's head.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

Figure 1:
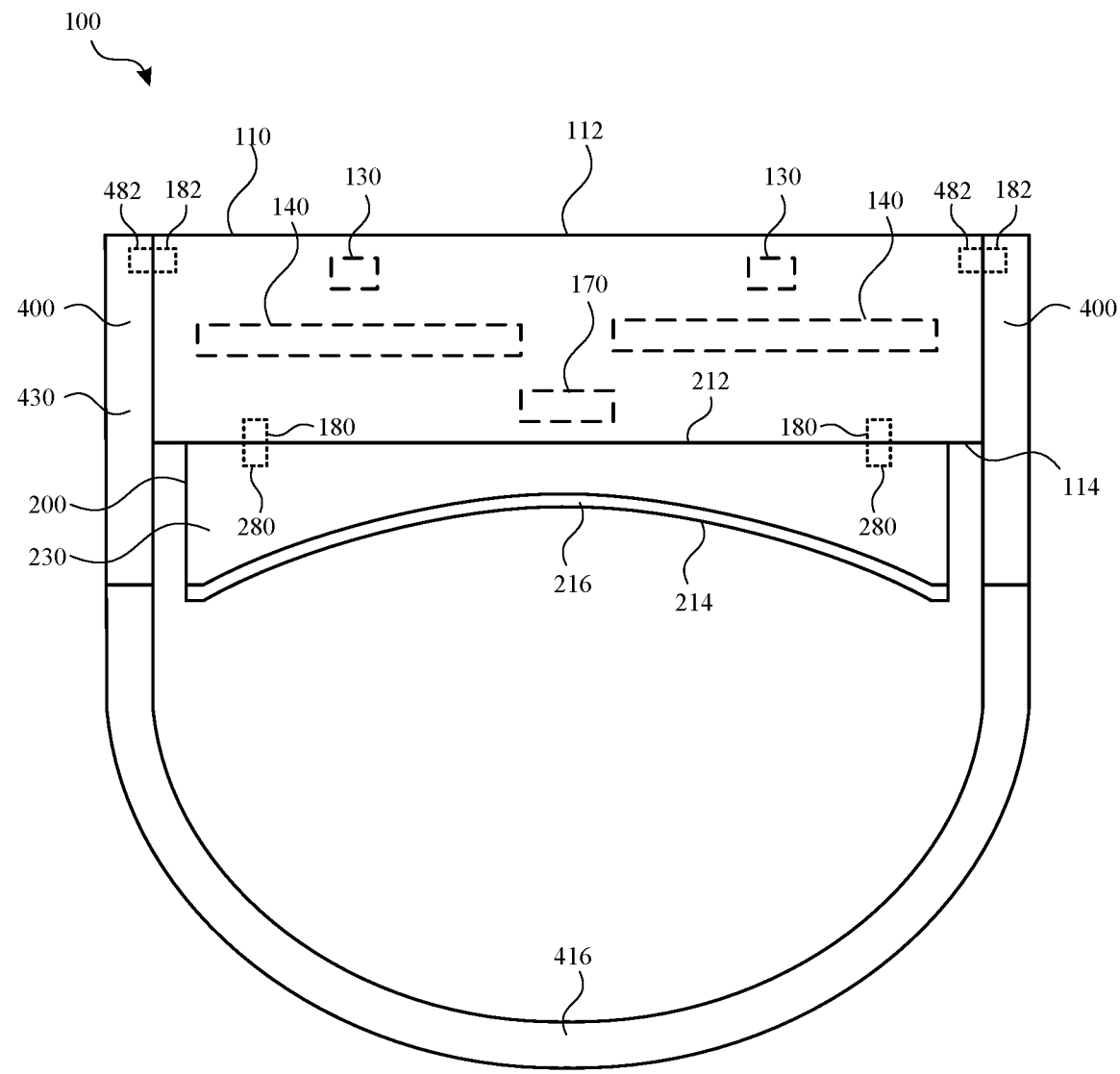
FIG. 1 illustrates a top view of a head-mountable device, according to some embodiments of the present disclosure.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

Head-mountable devices, such as head-mountable displays, headsets, visors, smartglasses, head-up display, etc., can perform a range of functions that are managed by the components (e.g., sensors, circuitry, and other hardware) included with the wearable device.

Many of the functions performed by a head-mountable device are optimally experienced when the components are in their most preferred position and orientation with respect to a user wearing the head-mountable device. For example, the head-mountable device can include a display that visually outputs display-based information toward the eyes of the user. The position and orientation of the displays relative to the eyes depends, at least in part, on how the head-mountable device is positioned on the face of the user. Due to variations in facial features across different users, a given head-mountable device may require adjustment to accommodate different users. For example, different users can have different facial features (e.g., face plane slope, forehead size, eye location).

A given user may benefit from the opportunity to try out different exchangeable components for a head-mountable device before the user decides which one provides the most optimal fit and alignment. The components not selected by the user can be made available to other users for trial and/or selection. While the component itself may eventually be worn by multiple users before being selected, it can be advantageous to protect each component, for example, with a liner that isolates the component from external and/or environmental influences. Such a liner can ultimately be removed by a user upon selection. However, the liner may remain in place until such selection occurs, thereby protecting the component from external and/or environmental influences even while any given user is using the component on a trial basis with a head-mountable device for evaluation purposes.

It advantageous to provide the user with an experience that closely resembles usage of the component and the head-mountable device without any liners. For example, such a liner can provide a contact surface that is similar to a contact surface of the component itself. As such, the user can try the component with an authentic experience prior to selection.

Embodiments of the present disclosure provide a head-mountable device with exchangeable components that can be selected by a user. Such components can include face and head engaging components to secure the head-mountable device on the face and head of the user. Liners can be provided to isolate the components from external and/or environmental influences until removed by a user upon selection of a given set of components. The liners can provide a contact surface that is similar to a contact surface of the component itself. As such, the user can try the component with an authentic experience prior to selection.

These and other embodiments are discussed below with reference to FIGS. 1-11. However, those skilled in the art will readily appreciate that the detailed description given herein with respect to these Figures is for explanatory purposes only and should not be construed as limiting.

According to some embodiments, for example as shown in FIG. 1, a head-mountable device 100 includes a frame 110 and a face engager 200 that are worn on a head of a user. The frame 110 can be positioned in front of the eyes of a user to provide information within a field of view of the user. The frame 110 and/or the face engager 200 can be positioned to engage portions of the user's face, such as the forehead, cheeks, temples, and nose. For example, the frame 110 and/or the face engager 200 can provide a nosepiece to rest on a user's nose.

The face engager 200 can include a face engager body 230 that provides structural support to one or more other components of the face engager 200. The face engager body 230 can include, extend between, and/or be connected to an inner side 214 and an outer side 212 of the face engager 200.

While the face engager 200 is shown schematically with a particular size and shape, it will be understood that the size and shape of the face engager 200, particularly at the inner side 214 of the face engager 200, can have a size and shape that accommodates the face of a user wearing the head-mountable device 100. For example, the inner side 214 can provide a shape that generally matches the contours of the user's face around the eyes of the user. The inner side 214 can be defined by a face engager inner layer 216 that is coupled to the face engager body 230. The face engager inner layer 216 can provide one or more features that allow the face engager 200 to conform to the face of the user to enhance comfort and block light from entering the face engager 200 at the regions of contact with the face. For example, the face engager inner layer 216, or portions thereof, can provide a flexible, soft, elastic, and/or compliant structure, as described further herein. The face engager body 230 can be more rigid than the face engager inner layer 216, such that the face engager body 230 holds the frame 110 in a given position and/or orientation, while the face engager inner layer 216 conforms to the face of the user.

Connectors can facilitate coupling of the frame 110 to the face engager 200 in a relative position and orientation that aligns the displays 140 of the frame 110 in a preferred position and orientation for viewing by the user. The frame 110 and the face engager 200 can be coupled to prevent ingress of light from an external environment. For example, frame connectors 180 can releasably engage face engager connectors 280. One or more of various mechanisms can be provided to secure the parts to each other. For example, mechanisms such as locks, latches, snaps, screws, clasps, threads, magnets, pins, an interference (e.g., friction) fit, knurl presses, bayoneting, and/or combinations thereof can be included to couple and/or secure the frame 110 and the face engager 200 together. The parts can remain secured to each other until an optional release mechanism is actuated. The release mechanism can be provided on an outer surface of the head-mountable device 100 for access by a user. As such, different face engagers 200 can be provided at different times (e.g., while worn by different users) for use with a given frame 110.

As further shown in FIG. 1, the frame 110 and/or the face engager 200 can be supported on a user's head with a head engager 400. The head engager 400 can wrap or extend along opposing sides of a user's head and/or to a rear of the user's head. The head engager 400 can optionally include earpieces for wrapping around or otherwise engaging or resting on a user's ears. It will be appreciated that other configurations can be applied for securing the head-mountable device 100 to a user's head. For example, one or more bands, straps, belts, caps, hats, or other components can be used in addition to or in place of the illustrated head engager 400 of the head-mountable device 100. The head engager 400 can optionally include a band for extending to and/or about a rear side of the head of the user. The head engager 400 can optionally extend from the frame 110 or another component coupled to the frame 110. For example, the head engager 400 can optionally extend from the face engager 200. The band or other structure can be stretchable to comfortably provide tension about the head of the user. The head engager can further include an adjustment element (not shown) for adjusting a tightness and/or fit of the head engager. A head engager inner layer 416 can be provided with one or more features that allow the head engager 400 to conform to the head of the user to enhance comfort at the regions of contact with the head. For example, the head engager inner layer 416, or portions thereof, can provide a flexible, soft, elastic, and/or compliant structure, as described further herein.

Connectors can facilitate coupling of the frame 110 and/or the face engager 200 to the head engager 400. For example, frame connectors 182 of the frame 110 can releasably engage head engager connectors 482 of the head engager 400. By further example, such connectors can be provided for connection to the face engager 200. One or more of various mechanisms can be provided to secure the parts to each other. For example, mechanisms such as locks, latches, snaps, screws, clasps, threads, magnets, pins, an interference (e.g., friction) fit, knurl presses, bayoneting, and/or combinations thereof can be included to couple and/or secure the frame 110 and/or the face engager 200 to the head engager 400. The parts can remain secured to each other until an optional release mechanism is actuated. The release mechanism can be provided on an outer surface of the head-mountable device 100 for access by a user. As such, different head engagers 400 can be provided at different times (e.g., while worn by different users) for use with a given frame 110 and/or face engager 200.

The frame 110 can provide structure around a peripheral region thereof to support any internal components of the frame 110 in their assembled position. For example, the frame 110 can enclose and support various internal components (including for example integrated circuit chips, processors, memory devices and other circuitry) to provide computing and functional operations for the head-mountable device 100, as discussed further herein. While several components are shown within the frame 110, it will be understood that some or all of these components can be located anywhere within or on the head-mountable device 100. For example, one or more of these components can be positioned within the face engager 200 and/or a head engager 400 of the head-mountable device 100.

The frame 110 can include and/or support one or more cameras 130. The cameras 130 can be positioned on or near an outer side 112 of the frame 110 to capture images of views external to the head-mountable device 100. The captured images can be used for display to the user or stored for any other purpose. Each of the cameras 130 can be movable along the outer side 112. For example, a track or other guide can be provided for facilitating movement of the camera 130 therein. As used herein, an outer side of a portion of a head-mountable device 100 is a side that faces away from the user and/or towards an external environment while the head-mountable device 100 is worn by the user.

The head-mountable device 100 can include displays 140 that provide visual output for viewing by a user wearing the head-mountable device 100. One or more displays 140 can be positioned on or near an inner side 114 of the frame 110. As used herein, an inner side of a portion of a head-mountable device 100 is a side that faces toward the user and/or away from the external environment while the head-mountable device 100 is worn by the user.

A display 140 can transmit light from a physical environment (e.g., as captured by a camera) for viewing by the user. Such a display 140 can include optical properties, such as lenses for vision correction based on incoming light from the physical environment. Additionally or alternatively, a display 140 can provide information as a display within a field of view of the user. Such information can be provided to the exclusion of a view of a physical environment or in addition to (e.g., overlaid with) a physical environment.

A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

In contrast, a computer-generated reality (CGR) environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations, (e.g., for accessibility reasons), adjustments to characteristic(s) of virtual object(s) in a CGR environment may be made in response to representations of physical motions (e.g., vocal commands).

A person may sense and/or interact with a CGR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects.

Examples of CGR include virtual reality and mixed reality.

A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end.

In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationery with respect to the physical ground.

Examples of mixed realities include augmented reality and augmented virtuality.

An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment.

An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

An augmented virtuality (AV) environment refers to a simulated environment in which a virtual or computer generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

There are many different types of electronic systems that enable a person to sense and/or interact with various CGR environments. Examples include head-mountable systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head-mountable system may have one or more speaker(s) and an integrated opaque display. Alternatively, a head-mountable system may be configured to accept an external opaque display (e.g., a smartphone). The head-mountable system may incorporate one or more imaging sensors to capture images or video of the physical environment, and/or one or more microphones to capture audio of the physical environment. Rather than an opaque display, a head-mountable system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

Each display 140 can be adjusted to align with a corresponding eye of the user. For example, each display 140 can be moved along one or more axes until a center of each display 140 is aligned with a center of the corresponding eye. Accordingly, the distance between the displays 140 can be set based on an interpupillary distance ("IPD") of the user. IPD is defined as the distance between the centers of the pupils of a user's eyes.

Referring now to FIGS. 2-5, a face engager and/or a head engager of the head-mountable device can be provided with one or more liners to protect such components during trial use. Such liners can include features that replicate the experience of wearing the head-mountable device without such liners. Additionally, such liners can be readily removed by a user.

Figure 2:
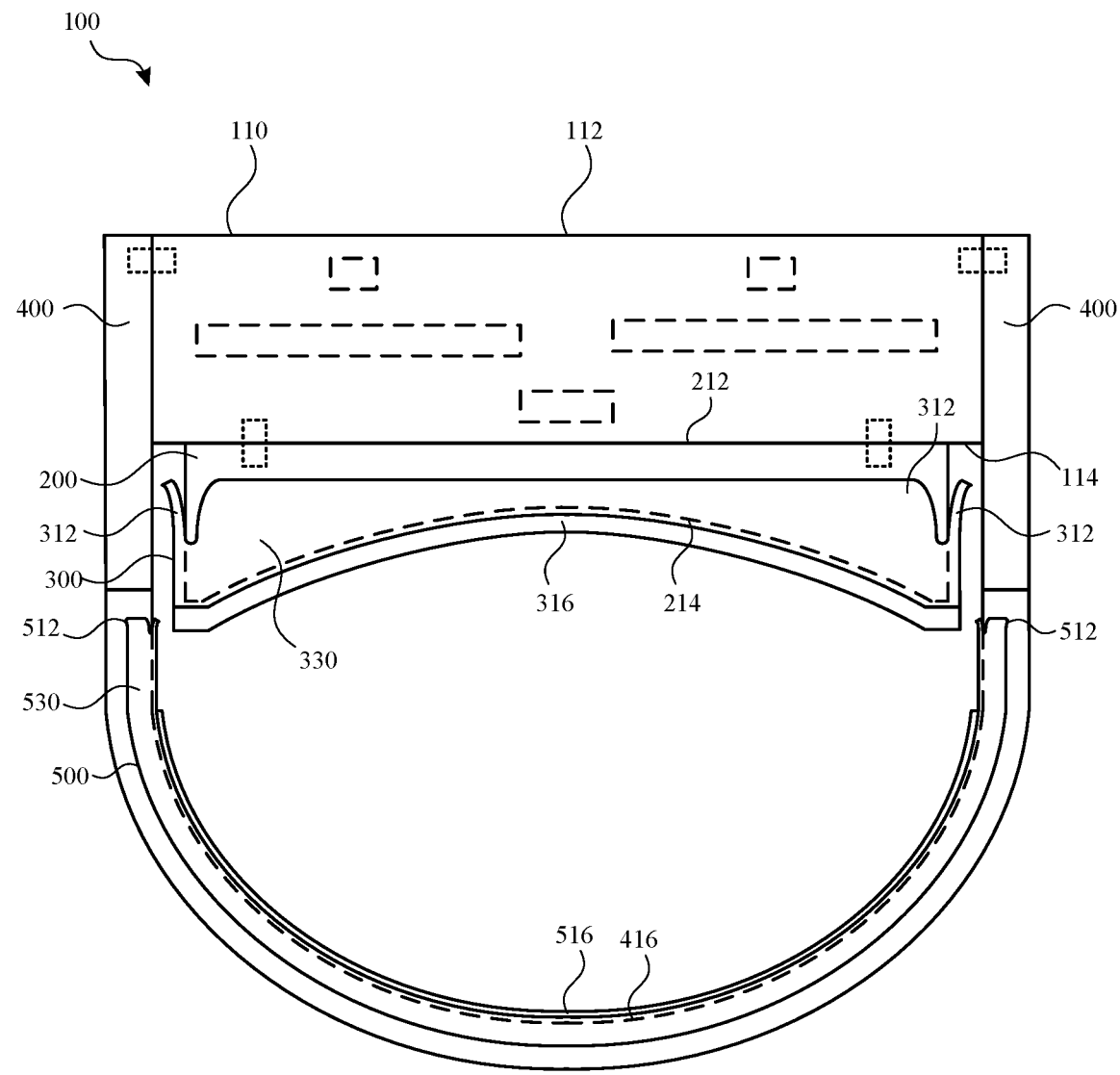
FIG. 2 illustrates a top view of the head-mountable device of FIG. 1 with protective liners, according to some embodiments of the present disclosure.

As shown in FIG. 2, while the face engager 200 is coupled to the inner side of the frame 110, a liner 300 can be provided to cover at least a portion of the face engager 200. The liner 300 can include a liner body 330 coupled to the face engager body 230 and/or another portion of the face engager 200, for example with an adhesive. The liner 300 can further include a liner inner layer 316 that covers the face engager inner layer 216, as described further herein. The liner inner layer 316 can form a shape that generally resembles and/or conforms to a shape of the face engager inner layer 216. While the liner 300 can cover portions of the face engager 200 that face and/or contact the user, other portions of the face engager 200 may remain uncovered by the liner 300. At least a portion of the liner 300 can be transparent to provide a view to the face engager 200, so that a user can observe the visual features thereof even while the liner 300 is coupled thereto.

The liner inner layer 316 can have one or more features that are similar to one or more features of the face engager inner layer 216. For example, the face engager inner layer 216 can include a material, and the liner inner layer 316 can include the same material. The face engager inner layer 216 and/or the liner inner layer 316 can include a fabric or other textile material. The face engager inner layer 216 and/or the liner inner layer 316 can be porous, breathable, and/or permeable to air. For example, the face engager inner layer 216 and/or the liner inner layer 316 can each form a mesh that includes portions of material and interstices there between. The mesh can include a structure that is woven, knit, molded, machined, stamped, monolithic, or combinations thereof.

As further shown in FIG. 2, while the head engager 400 is coupled to the frame 110 (e.g., at opposing sides thereof), a liner 500 can be provided to cover at least a portion of the head engager 400. In some embodiments, the liner 500 is separate from the liner 300. In some embodiments, the liner 500 is connected to and/or contiguous with the liner 300. The liner 500 can include a liner body 530 coupled to the head engager 400, for example with an adhesive. The liner 500 can further include a liner inner layer 516 that covers the head engager inner layer 416, as described further herein. The liner inner layer 516 can form a shape that generally resembles and/or conforms to a shape of the head engager inner layer 416. While the liner 500 can cover portions of the head engager 400 that face and/or contact the user, other portions of the head engager 400 may remain uncovered by the liner 500. At least a portion of the liner 500 can be transparent to provide a view to the head engager 400, so that a user can observe the visual features thereof even while the liner 500 is coupled thereto.

The liner inner layer 516 can have one or more features that are similar to one or more features of the head engager inner layer 416. For example, the head engager inner layer 416 can include a material, and the liner inner layer 516 can include the same material. The head engager inner layer 416 and/or the liner inner layer 516 can include a fabric or other textile material. The head engager inner layer 416 and/or the liner inner layer 516 can be porous, breathable, and/or permeable to air. For example, the head engager inner layer 416 and/or the liner inner layer 516 can each form a mesh that includes portions of material and interstices there between. The mesh can include a structure that is woven, knit, molded, machined, stamped, monolithic, or combinations thereof.

It will be understood that the features of the liner 300 with respect to the face engager 200 can be applied to the liner 500 with respect to the head engager 400. For example, while the face engager 200 and the head engager 400 can serve different purposes, the liner applied to each can provide the user with an experience that resembles usage of the head-mountable device with no liners. By further example, the inner layers of any given liner can have features that are similar to features of the component covered thereby, as described further herein. As such, any feature disclosed herein with respect to the liner 300 can, additionally or alternatively, be implemented with the liner 500.

Figure 3:
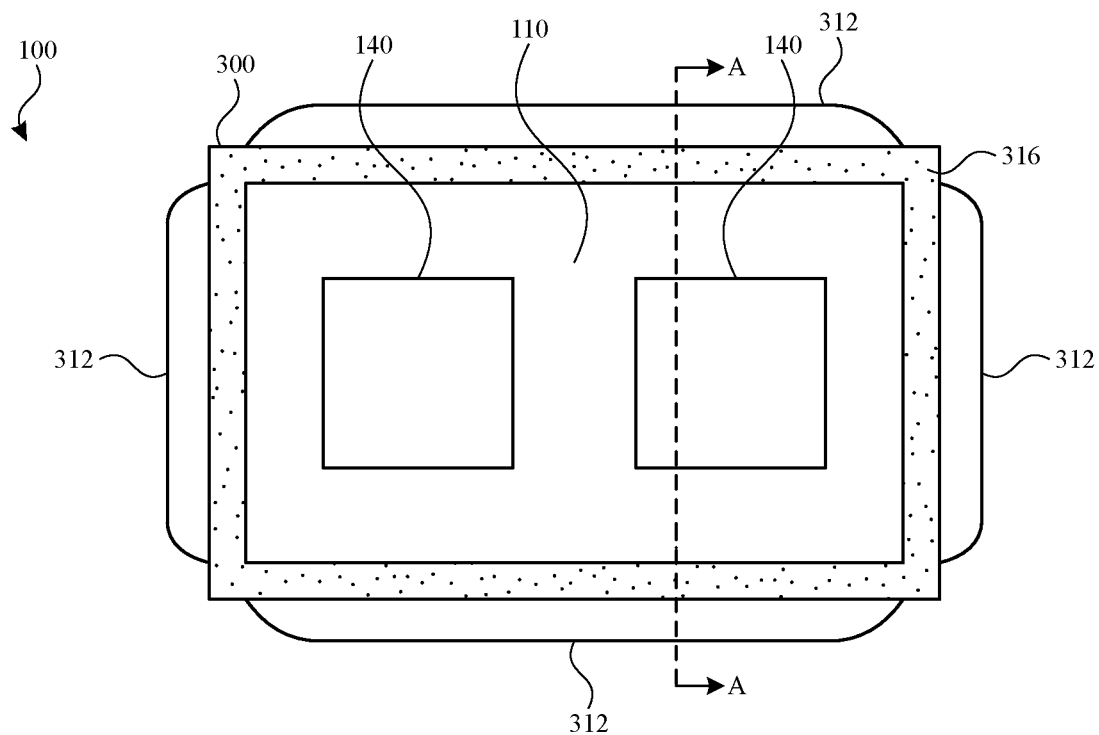
FIG. 3 illustrates a rear view of the head-mountable device of FIG. 2 with protective liners, according to some embodiments of the present disclosure.

As shown in FIG. 3, the liner 300 can cover at least a portion of a face engager, such that no portion of the face engager comes into direct contact with the user while the head-mountable device 100 is worn, for example on a trial basis. While wearing the head-mountable device 100 with the liner 300, the operations of the head-mountable device 100 can be provided in a typical manner to provide a user experience that resembles normal operation. For example, the liner 300 can provide a view to one or more displays 140 supported by the frame 110. By further example, the liner 300 can extend annual early or otherwise about a periphery of the frame 110 with the liner inner layer 316 facing the user. While the liner 300 and the liner inner layer 316 are shown as a continuous structure extending annual early, it will be understood that the liner 300 and the liner inner layer 316 can have one or more of a variety of other shapes. For example, both the face engager 200 and the liner 300 can include cutouts or other empty spaces to accommodate facial features of the user, such as the nose, cheeks, and the like. As such, any portion or surface of the face engager 200 that would contact the user when worn without that liner 300 (e.g., after component selection and liner removal) can be covered by the liner 300, including the liner inner layer 316 thereof.

Figure 4:
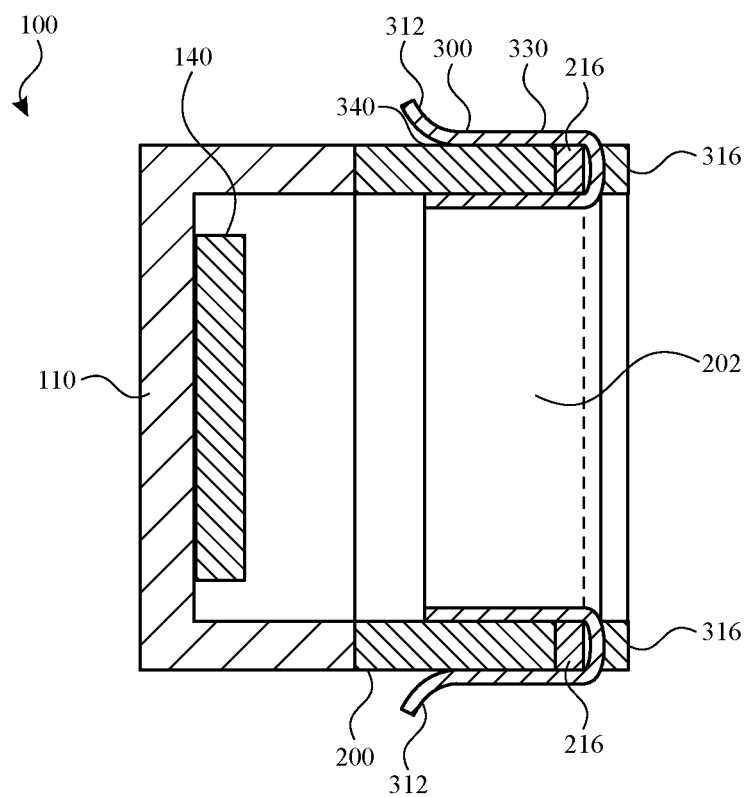
FIG. 4 illustrates a side sectional view of the head-mountable device of FIG. 3 taken along line A-A of FIG. 3, according to some embodiments of the present disclosure.

As shown in FIG. 4, the liner 300 can extend over the face engager inner layer 216 to provide a substitute with the liner inner layer 316. The liner body 330 can be coupled to the face engager body 230 with an adhesive 340. The relatively more rigid structure of the liner body 330 can provide a secure surface for bonding of the face engager body 230. The face engager body 230 can form tabs 312 at terminal ends thereof for facilitating removal of the liner 300 by the user. Such tabs 312 need not be bonded to the face engager 200. The liner body 330 can define and at least partially surround a channel 202 through which a view to the displays 140 can be provided. The liner body 330 can be coupled to radially inward (e.g., facing towards the channel 202) and radially outward (e.g., facing away from the channel 202) surfaces of the face engager 200, for example at the face engager body 230.

Figure 5:
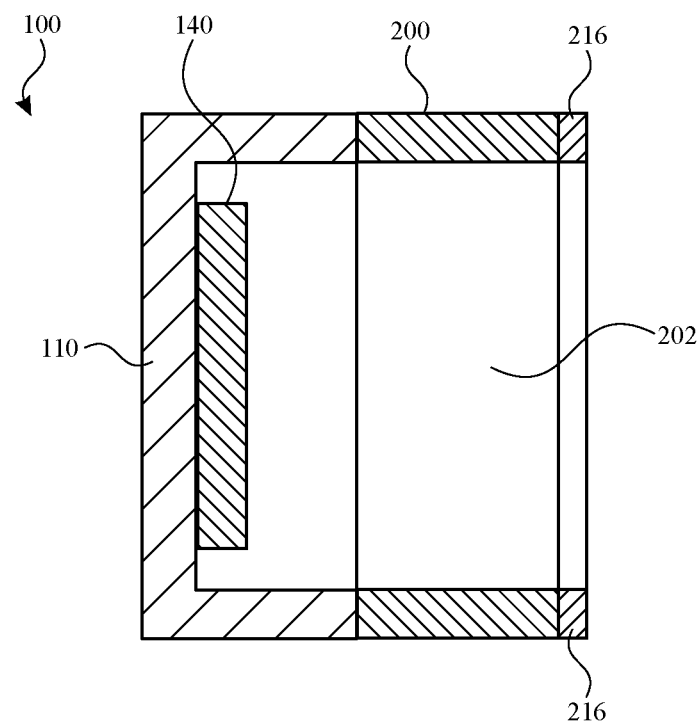
FIG. 5 illustrates a side sectional view of the head-mountable device of FIG. 4 without the protective liner, according to some embodiments of the present disclosure.

As shown in FIG. 5, the liner can be removed to expose and reveal the face engager 200. With the liner removed, the face engager inner layer 216 can be available for contacting the face of the user when the head-mountable device 100 is worn by the user. While in use, the face engager inner layer 216 can contact the face of the user and the face engager 200 can provide the channel 202 for observing a view to the display 140, which is supported by the frame 110.

Referring now to FIGS. 6-10, liners provided with a head-mountable device can be provided with features that allow verification of whether the liner has been removed and/or reapplied. Where a user may try a component of a head-mountable device, it can be preferred to maintain the liner during such trial usage. However, if a user removes the liner and wears the head-mountable device, it can be desirable to know that such an event has occurred so that a provider can determine whether the component may be offered to another user or whether the component should, instead, be cleaned or discarded.

While FIGS. 6-10 illustrate a liner 300 applied to a face engager 200, it will be understood that such features can, additionally or alternatively, be included with a liner applied to a head engager and/or another component of a head-mountable device. As such, the illustrated features of FIGS. 6-10 can additionally or alternatively represent features of a liner and a head engager.

Figure 6:
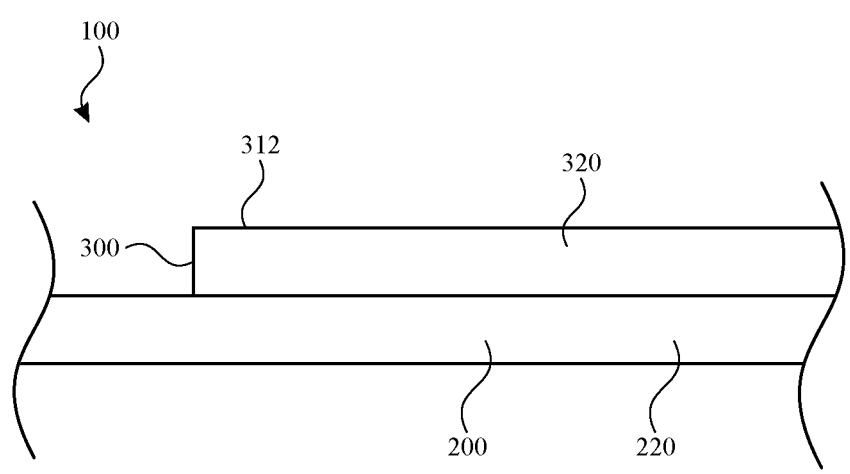
FIG. 6 illustrates a side view of a portion of a head-mountable device and a portion of a protective liner, according to some embodiments of the present disclosure.

As shown in FIG. 6, a liner 300 can be removably coupled to a face engager 200. The face engager 200 can include a face engager pattern 220, and the liner 300 can include a liner pattern 320. The face engager pattern 220 can optionally be provided at a face engager body of the face engager 200. The liner pattern 320 can optionally be provided at or near a tab 312 of the liner 300.

Figure 7:
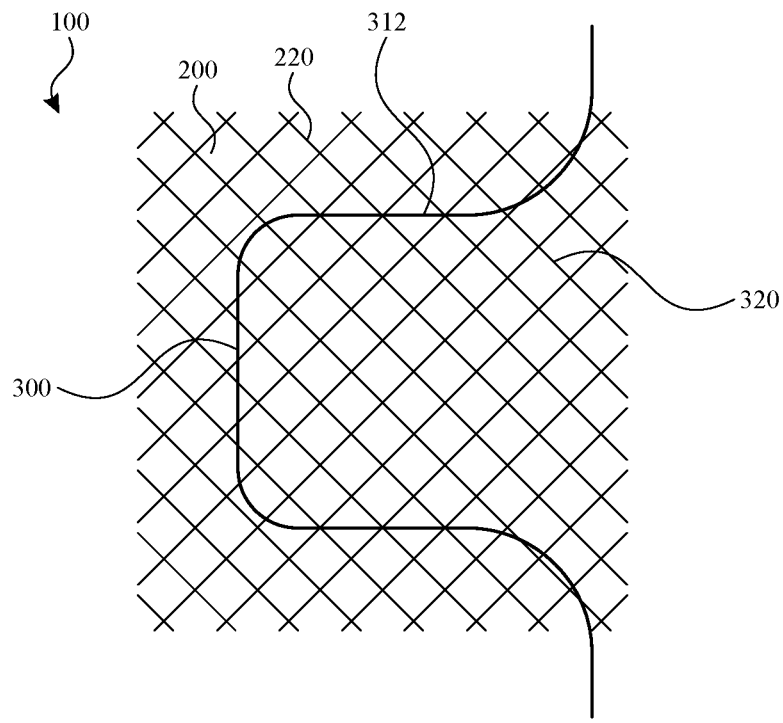
FIG. 7 illustrates a side view of the portion of the head-mountable device and the portion of the protective liner of FIG. 6, according to some embodiments of the present disclosure.

As shown in FIG. 7, the liner pattern 320 can be aligned with the face engager pattern 220 in an initial configuration. A portion of the liner 300 can be transparent or otherwise less than opaque to provide a view to a portion of the face engager 200. Additionally, any adhesive or other material used to couple the liner 300 to the face engager 200 can be transparent (e.g., a transparent adhesive). While aligned properly, the liner pattern 320 can overlap the face engager pattern 220 to block a view thereof. For example, the liner pattern 320 can be identical to the face engager pattern 220. By further example, the liner pattern 320 can match and overlap the face engager pattern 220 such that the overlapping patterns appear identical and as one pattern. Such an arrangement can allow a provider to verify that the liner 300 is in the same configuration as originally provided and that the liner 300 has not been removed from the face engager 200. As such, it can be confirmed that the face engager 200 (e.g., at the face engager inner layer) has not been exposed to an external or environmental influence, including coming into direct contact with the user.

Figure 8:
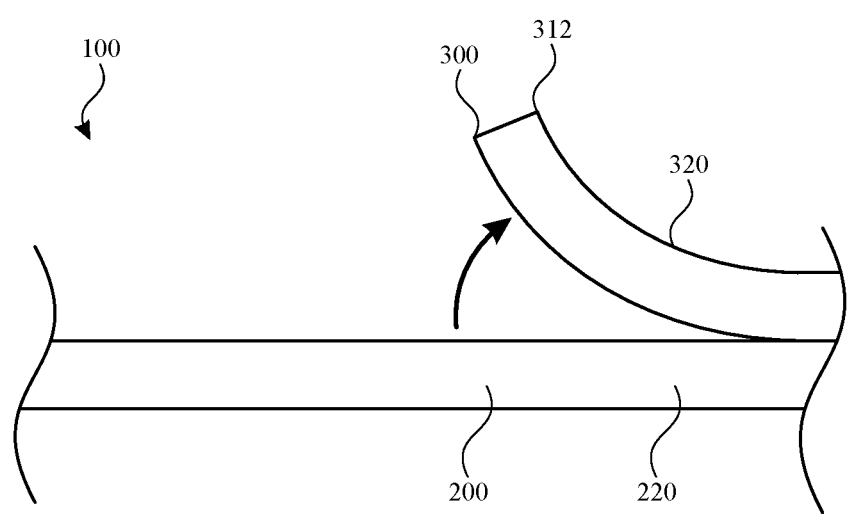
FIG. 8 illustrates a side view of the portion of the head-mountable device and the portion of the protective liner of FIG. 6, with the protective liner at least partially removed from the head-mountable device, according to some embodiments of the present disclosure.
Figure 9:
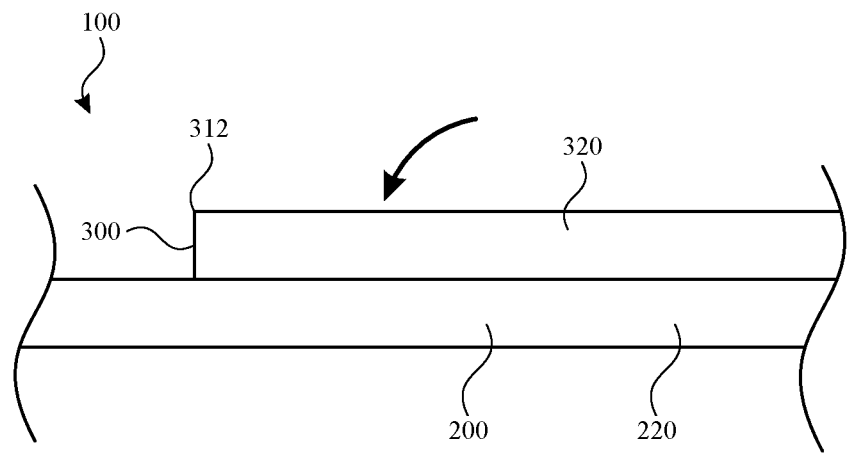
FIG. 9 illustrates a side view of the portion of the head-mountable device and the portion of the protective liner of FIG. 8, with the protective liner at least partially reattached to the head-mountable device, according to some embodiments of the present disclosure.

As shown in FIG. 8, the liner 300 can be removed from the face engager 200. Such a removal can be made by the user, for example when the face engager 200 is selected after a trial. However, such a removal would then expose the face engager 200 to external or environmental influences, potentially including coming into direct contact with the user while the head-mountable device is worn. As shown in FIG. 9, the user may attempt to replace the liner 300 and return the face engager 200 to a provider. It would be beneficial for the provider to determine whether such potential exposure occurred prior to the return.

Figure 11:
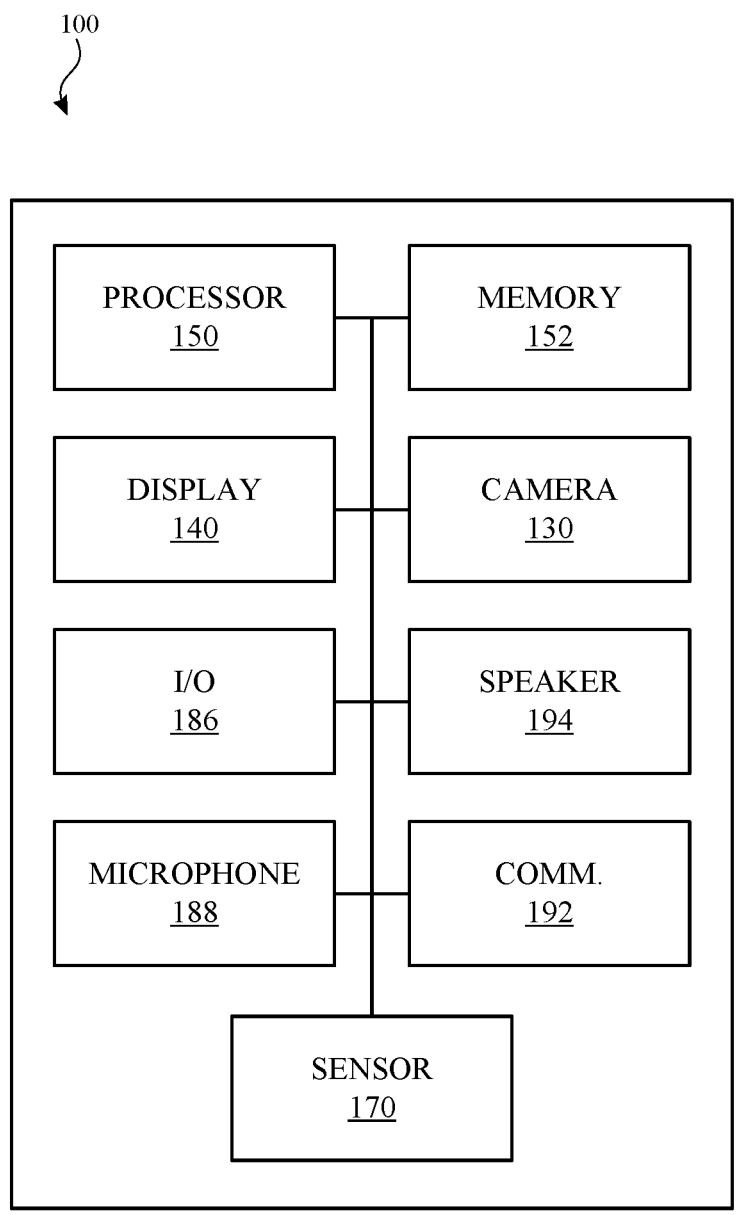
FIG. 11 illustrates a block diagram of a head-mountable device, in accordance with some embodiments of the present disclosure.

As shown in FIG. 11, the liner pattern 320 can be misaligned with the face engager pattern 220 in a later configuration. For example, when a user removes and replaces the liner 300, the alignment of the liner pattern 320 and the face engager pattern 220 can be different than in an initial configuration. For example, the liner pattern 320 can have a different position and/or orientation relative to the initial configuration. As such, the liner pattern 320 may not precisely and accurately match and overlap with the face engager pattern 220, and portions of the face engager pattern 220 can be visible through the liner 300. Such an arrangement can allow a provider to verify that the liner 300 is not in the same configuration as originally provided and that the liner 300 has been removed from the face engager 200 and subsequently replaced. As such, it can be confirmed that the face engager 200 (e.g., at the face engager inner layer) has potentially been exposed to an external or environmental influence, including coming into direct contact with the user.

Figure 10:
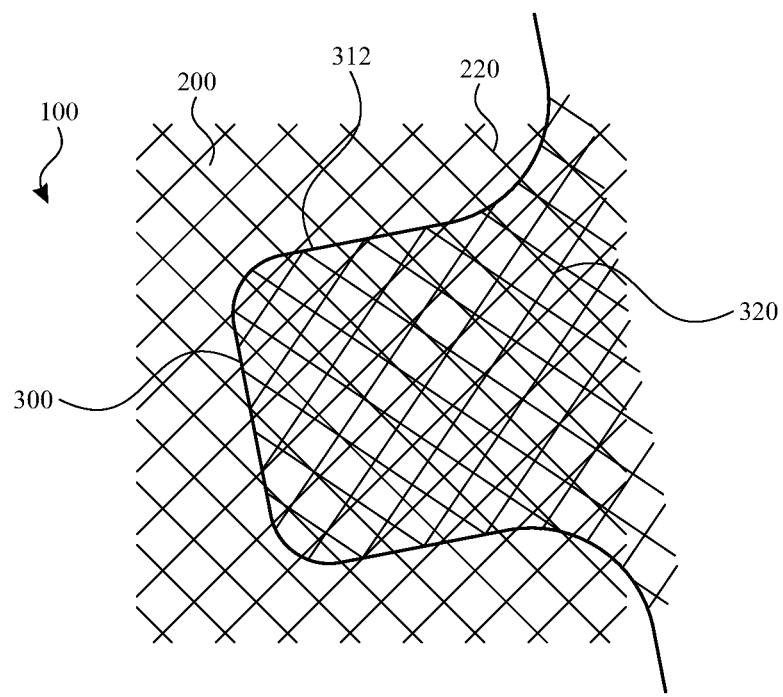
FIG. 10 illustrates a side view of the portion of the head-mountable device with the portion of the protective liner of FIG. 9, according to some embodiments of the present disclosure.

While particular patterns are shown in FIGS. 7 and 10, it will be understood that any number and variety of patterns can be provided. The patterns can be identical to each other, complementary, co-extensive, and the like.

Referring now to FIG. 11, components of the head-mountable device can be operably connected to provide the performance described herein. FIG. 11 shows a simplified block diagram of an illustrative head-mountable device 100 in accordance with one embodiment of the invention. It will be appreciated that components described herein can be provided on one, some, or all of an HMD module, a face engager, and/or a head engager. It will be understood that additional components, different components, or fewer components than those illustrated may be utilized within the scope of the subject disclosure.

As shown in FIG. 11, the head-mountable device 100 can include a processor 150 (e.g., control circuitry) with one or more processing units that include or are configured to access a memory 152 having instructions stored thereon. The instructions or computer programs may be configured to perform one or more of the operations or functions described with respect to the head-mountable device 100. The processor 150 can be implemented as any electronic device capable of processing, receiving, or transmitting data or instructions. For example, the processor 150 may include one or more of: a microprocessor, a central processing unit (CPU), an application-specific integrated circuit (ASIC), a digital signal processor (DSP), or combinations of such devices. As described herein, the term "processor" is meant to encompass a single processor or processing unit, multiple processors, multiple processing units, or other suitably configured computing element or elements.

The memory 152 can store electronic data that can be used by the head-mountable device 100. For example, the memory 152 can store electrical data or content such as, for example, audio and video files, documents and applications, device settings and user preferences, timing and control signals or data for the various modules, data structures or databases, and so on. The memory 152 can be configured as any type of memory. By way of example only, the memory 152 can be implemented as random access memory, read-only memory, Flash memory, removable memory, or other types of storage elements, or combinations of such devices.

The head-mountable device 100 can further include a display 140 for displaying visual information for a user. The display 140 can provide visual (e.g., image or video) output. The display 140 can be or include an opaque, transparent, and/or translucent display. The display 140 may have a transparent or translucent medium through which light representative of images is directed to a user's eyes. The display 140 may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface. The head-mountable device 100 can include an optical subassembly configured to help optically adjust and correctly project the image-based content being displayed by the display 140 for close up viewing. The optical subassembly can include one or more lenses, mirrors, or other optical devices.

The head-mountable device 100 can include one or more sensors 170, as described herein. The head-mountable device 100 can include one or more other sensors. Such sensors can be configured to sense substantially any type of characteristic such as, but not limited to, images, pressure, light, touch, force, temperature, position, motion, and so on. For example, the sensor can be a photodetector, a temperature sensor, a light or optical sensor, an atmospheric pressure sensor, a humidity sensor, a magnet, a gyroscope, an accelerometer, a chemical sensor, an ozone sensor, a particulate count sensor, and so on. By further example, the sensor can be a bio-sensor for tracking biometric characteristics, such as health and activity metrics. Other user sensors can perform facial feature detection, facial movement detection, facial recognition, eye tracking, user mood detection, user emotion detection, voice detection, etc. Sensors can include a camera which can capture image based content of the outside world.

The head-mountable device 100 can include an input/output component 186, which can include any suitable component for connecting head-mountable device 100 to other devices. Suitable components can include, for example, audio/video jacks, data connectors, or any additional or alternative input/output components. The input/output component 186 can include buttons, keys, or another feature that can act as a keyboard for operation by the user.

The head-mountable device 100 can include the microphone 188 as described herein. The microphone 188 can be operably connected to the processor 150 for detection of sound levels and communication of detections for further processing, as described further herein.

The head-mountable device 100 can include one or more speakers 194. The speakers 194 can be operably connected to the processor 150 for control of audio output, including sound levels, as described further herein.

The head-mountable device 100 can include communications circuitry 192 for communicating with one or more servers or other devices using any suitable communications protocol. For example, communications circuitry 192 can support Wi-Fi (e.g., a 802.11 protocol), Ethernet, Bluetooth, high frequency systems (e.g., 900 MHZ, 2.4 GHz, and 5.6 GHz communication systems), infrared, TCP/IP (e.g., any of the protocols used in each of the TCP/IP layers), HTTP, BitTorrent, FTP, RTP, RTSP, SSH, any other communications protocol, or any combination thereof. Communications circuitry 192 can also include an antenna for transmitting and receiving electromagnetic signals.

The head-mountable device 100 can include a battery, which can charge and/or power components of the head-mountable device 100. The battery can also charge and/or power components connected to the head-mountable device 100.

Accordingly, embodiments of the present disclosure provide a head-mountable device with exchangeable components that can be selected by a user. Such components can include face and head engaging components to secure the head-mountable device on the face and head of the user. Liners can be provided to isolate the components from external and/or environmental influences until removed by a user upon selection of a given set of components. The liners can provide a contact surface that is similar to a contact surface of the component itself. As such, the user can try the component with an authentic experience prior to selection.

Various examples of aspects of the disclosure are described below as clauses for convenience. These are provided as examples, and do not limit the subject technology.

Clause A: a frame having an outer side and an inner side; a face engager coupled to the inner side of the frame and comprising: a face engager body configured to releasably engage the frame and provide a view to the frame; and a face engager inner layer coupled to the face engager body and comprising a material; and a liner removably covering at least a portion of the face engager, the liner comprising: a liner body coupled to the face engager body; and a liner inner layer over the face engager inner layer and comprising a same material as the material of the face engager inner layer.

Clause B: a head-mountable device comprising: a frame; a head engager coupled to opposing sides of the frame and comprising a head engager inner layer comprising a material; and a liner removably covering at least a portion of the head engager, the liner comprising a liner inner layer over the head engager inner layer and comprising a same material as the material of the head engager inner layer.

Clause C: a head-mountable device comprising: a frame; a face engager releasably coupled to the frame and comprising a face engager pattern; and a liner removably coupled to the face engager and comprising a liner pattern, a portion of the liner being transparent to provide a view to a portion of the face engager, the liner pattern overlapping the face engager pattern to block a view thereof.

One or more of the above clauses can include one or more of the features described below. It is noted that any of the following clauses may be combined in any combination with each other, and placed into a respective independent clause, e.g., clause A, B, or C.

Clause 1: the material of the face engager inner layer and the material of the liner inner layer comprise a fabric.

Clause 2: the material of the face engager inner layer and the material of the liner inner layer is porous.

Clause 3: the liner body is coupled to the face engager body with an adhesive.

Clause 4: the liner at least partially surrounds a channel providing a view to a display of the frame.

Clause 5: the face engager body is more rigid than the face engager inner layer and the liner inner layer.

Clause 6: the frame comprises a frame connector on an inner side of the frame; and the face engager further comprises a face engager connector on an outer side of the face engager, the face engager connector being configured to releasably engage the frame connector.

Clause 7: a head engager coupled to opposing sides of the frame and comprising a head engager inner layer comprising a material; an additional liner removably covering at least a portion of the head engager, the additional liner comprising an additional liner inner layer over the head engager inner layer and comprising a same material as the material of the head engager inner layer.

Clause 8: a camera configured to capture a view; a display configured to display the view; a sensor; a microphone; and a speaker.

Clause 9: the material of the head engager inner layer and the material of the liner inner layer comprise a fabric.

Clause 10: the material of the head engager inner layer and the material of the liner inner layer is porous.

Clause 11: the liner body is coupled to the head engager with an adhesive.

Clause 12: the frame comprises frame connectors on the opposing sides of the frame; and the face engager further comprises face engager connectors each configured to releasably engage a corresponding one of the frame connectors.

Clause 13: the face engager pattern is identical to the liner pattern.

Clause 14: the liner is coupled to the face engager with a transparent adhesive.

Clause 15: the face engager comprises a face engager inner layer comprising a material; and the liner comprises a liner inner layer over the face engager inner layer and comprising a same material as the material of the face engager inner layer.

Clause 16: a head engager coupled to opposing sides of the frame and comprising a head engager pattern; and an additional liner removably covering at least a portion of the head engager, the additional liner comprising an additional liner pattern, a portion of the additional liner being transparent to provide a view to a portion of the head engager, the additional liner pattern overlapping the head engager pattern to block a view thereof.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

A reference to an element in the singular is not intended to mean one and only one unless specifically so stated, but rather one or more. For example, "a" module may refer to one or more modules. An element proceeded by "a," "an," "the," or "said" does not, without further constraints, preclude the existence of additional same elements.

Headings and subheadings, if any, are used for convenience only and do not limit the invention. The word exemplary is used to mean serving as an example or illustration. To the extent that the term include, have, or the like is used, such term is intended to be inclusive in a manner similar to the term comprise as comprise is interpreted when employed as a transitional word in a claim. Relational terms such as first and second and the like may be used to distinguish one entity or action from another without necessarily requiring or implying any actual such relationship or order between such entities or actions.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A phrase "at least one of" preceding a series of items, with the terms "and" or "or" to separate any of the items, modifies the list as a whole, rather than each member of the list. The phrase "at least one of" does not require selection of at least one item; rather, the phrase allows a meaning that includes at least one of any one of the items, and/or at least one of any combination of the items, and/or at least one of each of the items. By way of example, each of the phrases "at least one of A, B, and C" or "at least one of A, B, or C" refers to only A, only B, or only C; any combination of A, B, and C; and/or at least one of each of A, B, and C.

It is understood that the specific order or hierarchy of steps, operations, or processes disclosed is an illustration of exemplary approaches. Unless explicitly stated otherwise, it is understood that the specific order or hierarchy of steps, operations, or processes may be performed in different order. Some of the steps, operations, or processes may be performed simultaneously. The accompanying method claims, if any, present elements of the various steps, operations or processes in a sample order, and are not meant to be limited to the specific order or hierarchy presented. These may be performed in serial, linearly, in parallel or in different order. It should be understood that the described instructions, operations, and systems can generally be integrated together in a single software/hardware product or packaged into multiple software/hardware products.

In one aspect, a term coupled or the like may refer to being directly coupled. In another aspect, a term coupled or the like may refer to being indirectly coupled.

Terms such as top, bottom, front, rear, side, horizontal, vertical, and the like refer to an arbitrary frame of reference, rather than to the ordinary gravitational frame of reference. Thus, such a term may extend upwardly, downwardly, diagonally, or horizontally in a gravitational frame of reference.

The disclosure is provided to enable any person skilled in the art to practice the various aspects described herein. In some instances, well-known structures and components are shown in block diagram form in order to avoid obscuring the concepts of the subject technology. The disclosure provides various examples of the subject technology, and the subject technology is not limited to these examples. Various modifications to these aspects will be readily apparent to those skilled in the art, and the principles described herein may be applied to other aspects.

All structural and functional equivalents to the elements of the various aspects described throughout the disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for".

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately claimed subject matter.

The claims are not intended to be limited to the aspects described herein, but are to be accorded the full scope consistent with the language of the claims and to encompass all legal equivalents. Notwithstanding, none of the claims are intended to embrace subject matter that fails to satisfy the requirements of the applicable patent law, nor should they be interpreted in such a way.

What is claimed is:

1. A head-mountable device comprising:
   a frame having an outer side and an inner side;
   a face engager coupled to the inner side of the frame and comprising:
      a face engager body configured to releasably engage the frame and provide a view to the frame;
      a face engager inner layer coupled to the face engager body and comprising a fabric material; and
      a face engager pattern on a portion of the face engager body; and
   a liner removably covering the face engager inner layer and in a first configuration with respect to the face engager, the liner comprising:
      a liner body coupled to the face engager body; and
      a liner inner layer over the face engager inner layer and comprising a same fabric material as the fabric material of the face engager inner layer; and
      a liner pattern on a portion of the liner body, the portion of the liner body being of a transparent material to provide a view to the portion of the face engager body, the liner pattern overlapping the face engager pattern to block a view thereof through the transparent material, wherein in a second configuration of the liner with respect to the face engager, the transparent material provides an indication of misalignment of the liner pattern with respect to the face engager pattern.

2. The head-mountable device of claim 1, wherein the fabric material of the face engager inner layer and the material of the liner inner layer is porous.

3. The head-mountable device of claim 1, wherein the liner body is coupled to the face engager body with an adhesive.

4. The head-mountable device of claim 1, wherein the liner at least partially surrounds a channel providing a view to a display of the frame.

5. The head-mountable device of claim 1, wherein the face engager body is more rigid than the face engager inner layer and the liner inner layer.

6. The head-mountable device of claim 1, wherein:
   the frame comprises a frame connector on the inner side of the frame; and
   the face engager further comprises a face engager connector on an outer side of the face engager, the face engager connector being configured to releasably engage the frame connector.

7. The head-mountable device of claim 1, further comprising:

a head engager coupled to opposing sides of the frame and comprising a head engager inner layer comprising a material;

an additional liner removably covering at least a portion of the head engager, the additional liner comprising an additional liner inner layer over the head engager inner layer and comprising a same material as the material of the head engager inner layer.

8. The head-mountable device of claim 1, further comprising:
a camera configured to capture a view;
a display configured to display the view;
a sensor;
a microphone; and
a speaker.

9. A head-mountable device comprising:
a frame;
a head engager coupled to opposing sides of the frame and comprising:
a head engager body; and
a head engager inner layer comprising a fabric material; and
a head engager pattern on a portion of the head engager body; and
a liner removably covering the head engager inner layer and in a first configuration with respect to the head engager, the liner comprising:
a liner body removably coupled to the head engager body;
a liner inner layer over the head engager inner layer and comprising a same fabric material as the fabric material of the head engager inner layer; and
a liner pattern on a portion of the liner body, the portion of the liner body being of a transparent material to provide a view to the portion of the head engager body, the liner pattern overlapping the head engager pattern to block a view thereof through the transparent material, wherein in a second configuration of the liner with respect to the head engager, the transparent material provides an indication of misalignment of the liner pattern with respect to the head engager pattern.

10. The head-mountable device of claim 9, wherein the material of the head engager inner layer and the material of the liner inner layer is porous.

11. The head-mountable device of claim 9, wherein the liner is coupled to the head engager with an adhesive.

12. The head-mountable device of claim 9, wherein:
the frame comprises frame connectors on the opposing sides of the frame; and
the head engager further comprises head engager connectors each configured to releasably engage a corresponding one of the frame connectors.

13. A head-mountable device comprising:
a frame;
a face engager comprising:
a face engager body configured to releasably engage the frame and provide a view to the frame;
a face engager inner layer coupled to the face engager body;
a face engager pattern on a portion of the face engager body; and
a liner in a first configuration with respect to the face engager, the liner comprising:
a liner body removably coupled to the face engager body;
a liner inner layer over the face engager inner layer; and
a liner pattern on a portion of the liner body, the portion of the liner body being of a transparent material to provide a view to the portion of the face engager body, the liner pattern overlapping the face engager pattern to block a view thereof through the transparent material, wherein in a second configuration of the liner with respect to the face engager, the transparent material provides an indication of misalignment of the liner pattern with respect to the face engager pattern.

14. The head-mountable device of claim 13, wherein the face engager pattern is identical to the liner pattern.

15. The head-mountable device of claim 13, wherein the liner is coupled to the face engager with a transparent adhesive.

16. The head-mountable device of claim 13, further comprising:
a head engager coupled to opposing sides of the frame and comprising a head engager pattern; and
an additional liner removably covering at least a portion of the head engager, the additional liner comprising an additional liner pattern, a portion of the additional liner being transparent to provide a view to a portion of the head engager, the additional liner pattern overlapping the head engager pattern to block a view thereof.

17. The head-mountable device of claim 13, wherein:
the frame comprises a frame connector on an inner side of the frame; and
the face engager further comprises a face engager connector on an outer side of the face engager, the face engager connector being configured to releasably engage the frame connector.

* * * * *